2,947,982

SERVO DRIVE SYSTEM WITH DYNAMIC ERROR ELIMINATION

William H. Newell, Mount Vernon, N.Y., assignor to Sperry-Rand Corporation, Ford Instrument Company Division, Long Island City, N.Y., a corporation of New York Filed Aug. 16, 1955, Ser. No. 528,616

4 Claims. (Cl. 343—7)

This invention relates to an error compensator which has general application to closed loop follow-up systems employing separate servos in series but has particular utility in association with gun control systems in which the gun positioning units are servos effecting the positioning in space of radar mounted on the gun.

Where servos are employed to position gun mounts in a closed servo loop system, which includes radar, any erratic motion appearing in the gun drive servo output is transmitted to the radar and in turn to the signal which operates the gun drive. Such motion may originate in the gun driving mechanism itself, and by affecting the signal may cause oscillation or amplification of the undesired erratic motion.

Generally the invention provides means for removing this type of follow-up error in a servo loop system by actively measuring the errors in the servos in the loop and subtracting them from the signal transmitted to the servos. There results an improvement in the stability of the system which is especially noticeable where the response time must be very fast.

One object of the invention is to provide an error compensator which is generally applicable to a conventional, follow-up, loop system employing an electrical error signal to drive a follow-up.

Another object of the invention is to provide an error compensator to stabilize a servo loop system employed in gun control.

Figure 1:
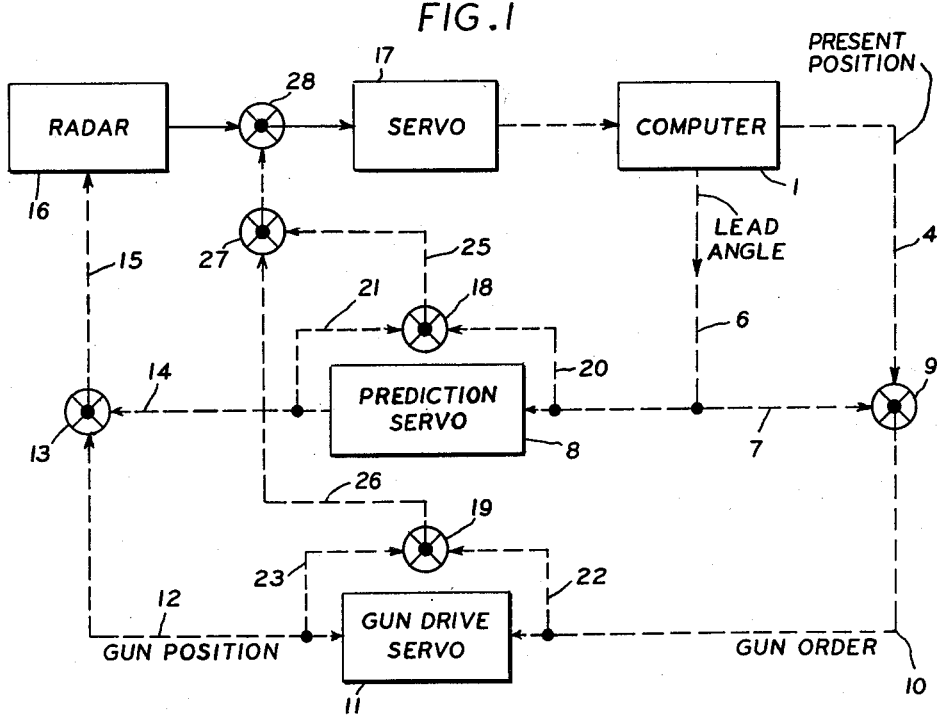

Other objects and advantages of the invention may be apparent from the following detailed description taken in conjunction with the drawings in which Fig. 1 is a schematic showing a closed loop gun drive system which is stabilized by the invented errror compensator applied to a conventional follow-up system.

Figure 2:
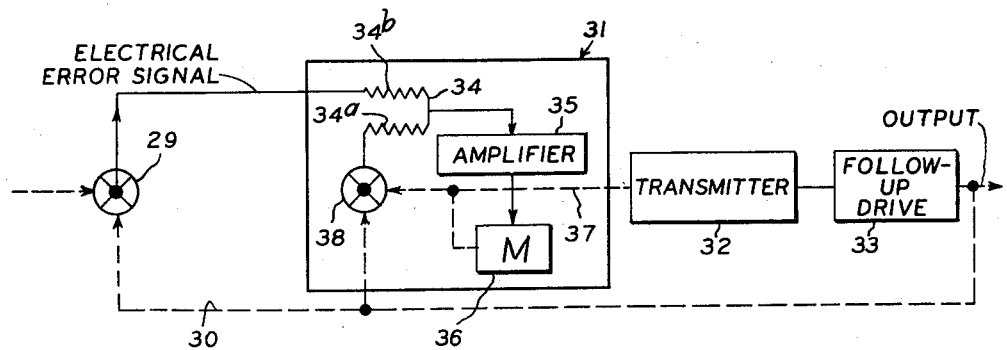

Fig. 2 is a schematic showing a modified closed loop system with an error compensator arranged to stabilize the modified system.

In the stabilized gun control system of Fig. 1 computer 1 is of a well known regenerative type of instrument which continuously generates present position of the target and lead angle for the gun. Errors in the generated position are observed and used to correct the rates used in the computer for generation. Target present position is one output of the computer and is placed on shaft 4.

The computer has a second output on shaft 6 representing lead angle. Shaft 7 is driven by shaft 6 and transmits this quantity to prediction servo 8 and to one side of differential 9, the other input for the differential 9 being placed thereon by shaft 4. The differential 9 adds the two inputs and drives output shaft 10 the turning of which represents the final gun order which is transmitted to the gun drive servo 11 whereby servo 11 is employed to position the gun mount. Servo output shaft 12 is thereby driven in accordance with gun position modified by any errors in gun drive servo 11 and is connected to one side of differential 13. Differential 13 represents a space comparison of the movement of the gun mount and the movement of the radar on it. Connection 14 representing the output of prediction servo 8 moves the radar antenna relative to the gun and is connected to the other side of the differential 13. The output of the differential represents present position modified by any errors in servo drives 8 and 11 and is indicated on feed-back connection 15 which is driven by the differential.

The antenna of radar 16, which is employed to produce a signal for the automatic gun control system is effectively moved in space by connection 15. The direction of the transmitted radar beam is therefore controlled by the mechanical quantity representing generated target position modified by the errors in drives 8 and 11. The radar error signal which is produced by the radar antenna servo is servoed by servo 17 to become the error signal for the computer 1. When the radar antenna is on target, the outputs generated by the computer represent values of present target position and lead angle modified by the errors in drives 8 and 11.

To eliminate the instability in the system caused by errors in the servo drives 8 and 11 a comparison of the transmitted signals to the servos and their output is effected by differentials 18 and 19 which are placed across the prediction and gun drive servos, respectively. Shafts 20 and 21 are driven by connections with shafts 7 and 14, respectively, and feed the quantities on these shafts to the opposite sides of the differential 18. Similarly the shafts 22 and 23, being driven by shafts 10 and 12, respectively, feed the quantities on these shafts to the differential 19. The output of differentials 18 and 19 are fed to differential 27 by means of spider shafts 25 and 26, respectively, and the combined errors for the two servos are subtracted from the radar error signal by electrical differential 28. Therefore, if the input and output of either servo are not equal, the error signal employed to drive the servo 17 is modified by a like amount. Thus errors in the gun drive are not reflected back into the error signal to the computer. An error in the signal due to an error in either servo drive 8 or 11 this error will not be acted upon by the computer. The computer will only receive the errors which are due to errors in its own generated quantities. Thus any erratic motions of servo drives 8 or 11 will not affect the signal transmitted to them and cause oscillation.

In Fig. 2 a more general application of the principle of error compensation is illustrated. A standard follow-up drive having a mechanically driven transmitter is operated by an electrical error signal. An electrical differential 29 produces an electrical error signal which represents the difference between the input to the differential and the quantity in feed-back shaft 30. The error signal is placed in a converting servo 31 the output of which is fed mechanically to transmitter 32 which operates the standard follow-up drive 33. The drive 33 transmits a mechanical equivalent of the signal modified by the errors in the drive to the output and back to the differential 29 on shaft 30 thus forming a closed loop system.

The converting servo 31 comprises a comparison network 34 one leg of which is connected to the line carrying the error signal. The output of the comparison network 34 is fed to the amplifier 35 and the amplified signal with appropriate damping is employed to energize a motor 36 the output of which is placed in the transmitter 32 on shaft 37. The error compensation is obtained in the following manner. Shaft 37 is also connected following to one side of electrical differential 38 whose other input side is connected to feed-back shaft 30 which is driven in accordance with the output of the follow-up drive 33. The output of the differential therefore representing the error in drive 33 is placed on the other leg 34a of the comparison network 34. If the error in drive 33 as placed on leg 34a equals the error from differential 29 in leg 34b the input to amplifier 35 is nulled and no effect on the transmitter 32 is produced. Errors inhering in the follow-up 33 are thus not fed back to transmitter 32. The stability of the system is thereby greatly improved and it acts as though it consisted of two independent servos in series rather than in a closed loop.

It is understood that one skilled in the art may effect modifications in the error compensator as described as well as the basic systems to which the compensator is applied without departing from the scope and principles of the invention which are defined by the appended claims.

What is claimed is:

1. An error compensated, closed loop system comprising drive means adapted to be operated by an electrical error signal, means for generating said error signal, means for transmitting the error signal to said drive means, feedback means connecting the output of said drive means to the input side of said error signal generating means whereby quantities in said feedback connection represent the output of said drive means modified by motion errors inhering therein, and means for comparing said transmitted error signal with the output of said drive means and for modifying the output of said error signal generating means in accordance with the output of said comparing means as determined by the comparison of said transmitted error signal and the output of said drive means, whereby said motion errors may be subtracted from the error signal transmitted to said drive means.

2. An error compensated, closed loop system as claimed in claim 1 whereby said error signal transmitting means include a servo drive and computer in series, said computer being adapted to generate continuously quantities representing target present position and lead angle, a prediction servo, said error signal transmitting means including means for introducing the lead angle quantities to said prediction servo and means for combining lead angle and present position quantities and introducing the combined quantities to said drive means, said feedback means include means for subtracting the output of said prediction servo from the output of said drive means whereby the feedback quantities placed in said error signal transmitting means represent target present position modified by motion errors in the drive means and said comparing and modifying means include a pair of series connected differentials, the first of said pair of differentials being connected across the drive means and the other differential being connected to receive the output of said error signal transmitting means and the output of said first differential and introduce the modified error signal to said error signal transmitting means.

3. An error compensated, closed loop system as claimed in claim 2 wherein said error signal generating means is a radar antenna servo and there is provided a prediction servo connected to the output of said drive means, comparing means are connected across said prediction servo, and there is provided means for combining the output of said prediction servo comparing means with the output of the differential disposed across said drive means.

4. An error compensated, closed loop system as claimed in claim 1 wherein said error signal generating means is a mechanically driven, input differential adapted to yield an electrical error signal and said comparing and modifying means is a comparison network having a pair of resistive legs, one resistive leg being connected to the output of said differential device and the other resistive leg being connected to receive the output of said drive means, there being disposed means between the output of said drive means and the said other leg of the comparison network means for converting the mechanical output of the drive means to a corresponding electrical signal, the output side of said comparison network being connected to the error signal transmitting means, whereby said comparison network is adapted to modify the output of said input differential in accordance with an error quantity representing the difference between the input to and the output of said drive means.

No references cited.